SYSTEM FOR REMOVING INFLUENCE OF MOMENTARY BREAK IN THE COMMUNICATION LINE TO THE RECEIVED PICTURE IN THE FACSIMILE EQUIPMENT AND THE LIKE

Filed Feb. 14, 1963 3 Sheets-Sheet 1

INVENTORS
Ryomei Kubota Nagomi Kondo
Tadashi Saito Masaru Odomari
BY
Michael S. Striker
ATTORNEY Nov. 26, 1963 RYOMEI KUBOTA ETAL 3,112,361

SYSTEM FOR REMOVING INFLUENCE OF MOMENTARY BREAK IN THE COMMUNICATION LINE TO THE RECEIVED PICTURE IN THE FACSIMILE EQUIPMENT AND THE LIKE

Filed Feb. 14, 1963 3 Sheets-Sheet 2

INVENTORS
Ryomei Kubota Nagomi Kondo
Tadashi Saito Masaru Odomari
BY
Michael S. Striker
ATTORNEY INVENTORS
Ryomei Kubota Nagomi Kondo
Tadashi Saito Masaru Odomari
BY
Michael S. Striker
ATTORNEY United States Patent Office 3,112,361
Patented Nov. 26, 1963

3,112,361
SYSTEM FOR REMOVING INFLUENCE OF MOMENTARY BREAK IN THE COMMUNICATION LINE TO THE RECEIVED PICTURE IN THE FACSIMILE EQUIPMENT AND THE LIKE

Ryomei Kubota, Nerima-ku, Tokyo, Tadashi Saito, Setagaya-ku, Tokyo, Nagomi Kondo, Kita-ku, Tokyo, and Masaru Odomari, Kashiwa-shi, Chiba-ken, Japan, assignors to Asahi Shimbunsha Publishing Co., Ltd., Osaka, Japan Filed Feb. 14, 1963, Ser. No. 258,503
3 Claims. (Cl. 178—6.6)

This invention relates to the facsimile transmission system and, particularly to a system for removing influence of momentary break to the received picture in the facsimile equipment and the like when the momentary break occurs in a communication line therefor.

It is inevitable in the communication line that momentary break occurs from time to time. Particularly, in the microwave circuit momentary break unavoidably occurs due to the fading phenomenon of radio wave propagation. As a result of such a momentary break, in a facsimile equipment and other telegraph having a similar object thereto, a disadvantageous area is recorded in the received picture due to the momentary break. Now such a fact will be explained with respect to a transmission of a full page of newspaper by facsimile. However, this description will be understood to be illustrative of the invention. The transmission of a full page of newspaper by facsimile is a system wherein a full page of newspaper is used as it is as the descriptive material to be transmitted and a photographic film is used as a receiving paper. An image is transferred from the received film to a metal plate. Then a newspaper is prepared by a letterpress or an off-set system printing.

A descriptive material which is placed around the cylinder of the transmitter in a transmission of a full page of newspaper by facsimile is composed of the blacks and the whites which are the same with the finished newspaper. If the signal current is transmitted upon an amplitude modulation effected in such a manner that the blacks in the descriptive material correspond to the high output level in the transmitter and if a momentary break occurs, the black signal disappears in the corresponding area to the momentary break. The fact that the black signal does not arrive at the receiving side is considered equal to that the receiving side receives the white signal which corresponds to the low output level. Therefore, the area corresponding to the momentary break is recorded black or opaque regardless of the content of the descriptive material in the receiving film which is recorded as a negative picture, and is left as white or is not printed in the finished printed matter.

In an equipment where the number of scanning lines for the transmission of a full page of newspaper by facsimile is twelve per millimeter, that is, the traverse scanning proceeds through a length of 1/12 mm. during a revolution of the main scanning around the cylinder which revolves three times a second, if a momentary break occurs and lasts 1/3 second, it may be seen that a white area having a width of 1/12 mm. and a length equal to one revolution of the cylindrical surface would be left in the finished printed surface. In this specification we make frequent use of the terms "main scanning" and "traverse scanning." The former means the scanning done circumferentially around the cylinder and is called also the high speed scanning. The latter means the scanning done along the axis of the cylinder and is called also the low speed scanning.

There is not a countermove against momentary break in the facsimile system and the like at present. For example, in case of the transmission of a full page of newspaper by facsimile, if a momentary break occurs, it is inevitable to repeat the transmission for the page from the start thereof or at least to repeat the part of the transmission which corresponds to the momentary break and thereafter and has a sufficient margin and to paste-up the first interrupted image with the second partly repeated image so as to coincide the marginal part before the interruption of the former with the margin of the latter, in order to reproduce a complete page. Therefore, it is probable that the efficiency in the newspaper production diminishes considerably. In Japan, the fading phenomenon occurs frequently in June, July, and August yearly. Due to the fact we have experienced such repetition of transmission and such paste-up work because of momentary break for our newspaper production by means of a facsimile using a microwave circuit, resulting in sometimes to fail to catch a predetermined train on which the newspaper was to be loaded to deliver to local subscribers.

It is an object of this invention to provide a system whereby such influence due to momentary break as above is removed.

Briefly stated in accordance with one aspect of this invention, there is provided, in a facsimile equipment comprising a sending side, a receiving side, and two communication lines connecting the former with the latter, said sending side comprising a cylinder on which a descriptive material is subjected to a main scanning and a traverse scanning simultaneously, and said receiving side comprising a cylinder on which a receiving material is subjected to a main scanning and a traverse scanning simultaneously and a means of exposing a spot on the second-named cylinder with a light to form a picture, a system for removing influence of a momentary break in the principal one of said two communication lines to said picture, comprising steps of detecting said momentary break automatically at said receiving side when the same occurs, interrupting the second-named traverse scanning and said exposing at said receiving side and simultaneously sending a traverse scanning interrupting signal to said sending side through the other of said two communication lines when said detection of momentary break is signalled, detecting the first-named signal at said sending side, interrupting only the first-named traverse scanning at said sending side, detecting an end of the first-named momentary break at said receiving side, resuming said exposing at said receiving side when said detection of said end is signalled, resuming the second-named traverse scanning with delay from said resuming of said exposure and simultaneously sending a traverse scanning resuming signal to said sending side through the other of said two communication lines, detecting the last-named signal at said sending side, and resuming the first-named traverse scanning at said sending side.

The invention will be better understood and other objects and additional advantages of the invention will become apparent upon perusal of the following description taken in connection with the drawings, in which.

Referring more particularly to the drawings, the preferred embodiment of this invention will now be described; however, this description will be understood to be illustrative of the invention and not as limiting it to the particular arrangement shown and described. In the sending side of this facsimile system, there is a cylinder rotating at a constant position, that is, the cylinder rotates on an axis thereof but does not displace axially. A descriptive material is wrapped round the cylinder. A main scanning whereby a scanning spot displaces circumferentially is done by means of a photoelectric tube or the like which displaces also axially simultaneously so as to do so-called traverse scanning. In the receiving side, a photographic film wrapped cylinder is rotated synchronously with the sending cylinder with respect to speed and phase and a photorecording head employing a glow tube modulator is displaced synchronously with the displacement of the photoelectric tube in the sending side with respect to speed.

Figure 1:
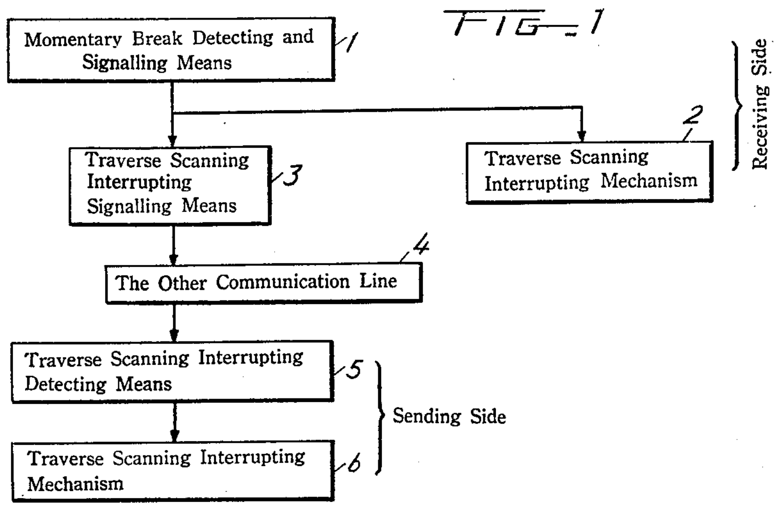
FIG. 1 is a diagram illustrating an arrangement of means in connection with the traverse scannings at the sending side and the receiving side.

In accordance with the system embodying this invention, there is provided with arrangements illustrated in FIG. 1 in the sending side and the receiving side, which comprises a momentary break detecting and signalling means 1 which detects a momentary break in the principal communication line and signals such a fact that a momentary break occurs to a traverse scanning interrupting mechanism 2 and a traverse scanning interrupting signalling means 3. The traverse scanning interrupting mechanism 2 interrupts the traverse scanning in the receiving side automatically in accordance with the signal sent from the momentary break detecting and signalling means 1. The traverse scanning interrupting signalling means 3 signals to the effect that the momentary break occurs in the principal communication line to the sending side in accordance with the signal sent from the momentary break detecting and signalling means 1, where an output of the traverse scanning interrupting signalling means 3 is sent to the sending side by a suitable means through the other communication line 4. A detecting means 5 provided in the sending side receives the signal sent from the traverse scanning interrupting signalling means 3, whereby the information showing the occurrence of momentary break in the principal communication line sent from the receiving side is detected. A traverse scanning interrupting mechanism 6 which interrupts the traverse scanning in the sending side is controlled by the output of the detecting means 5.

By means of the above arrangement, at the receiving side, (1) the traverse scanning, that is, the displacement of the photorecording head is interrupted instantaneously and simultaneously with an occurrence of a momentary break in the principal communication line. At the same time, the function of the photorecording head, that is, the lighting of the head onto the receiving photographic film is also interrupted. But the main scanning, that is, the rotation of the receiving cylinder is continued as it is. (2) At the same time with the interruption of the traverse scanning of the receiving side, a signal is sent from the receiving side to the sending side through the other communication line so as to interrupt the traverse scanning only at the sending side. Therefore, the main scanning at the sending side is continued as it is.

Figure 2:
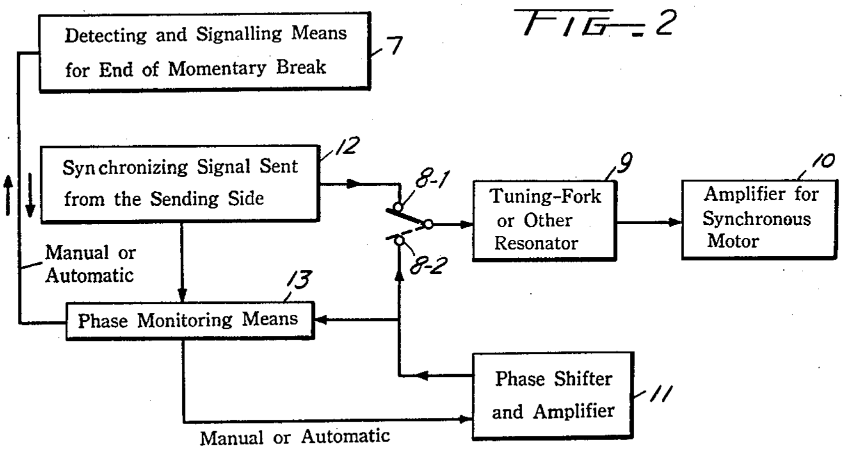
FIG. 2 is an explanatory diagram illustrating means for converting a transmission from a synchronizer to another synchronizer and restoring it reversely.

In addition, (3) in case a transmission synchronizing system defined below is adopted for the facsimile, that is, in case the receiving side is provided with such a resonator as a tuning-fork for the transmission synchronizing, it is necessary to switch off a circuit including said resonator so as to make the resonator functionate as an independent synchronizing means and to hold the synchronized operation of the receiving cylinder during the period where the momentary break continues, other than the performance stated in the above (1). In this specification we make frequent use of the terms "transmission synchronizing" and "independent synchronizing." In accordance with the "transmission synchronizing" system, specified means are provided which, transmission synchonizers, send and receive a signal which controls the speed of the recorder mechanism, together with the picture signal. Meantime, in accordance with the "independent synchronizing" system, tuning forks or crystal controlled oscillators having frequencies which coincide with each other precisely are provided in the sending side and the receiving side, and the cylinders in the sending side and the receiving side are driven by the outputs thereof, respectively. FIG. 2 shows a means whereby the transmission synchronizing system is converted into the independent synchronizing system and vice versa. In case where a particularly highly precise resonator is not provided, it is necessary to switch off to an independent synchronizing means provided additionally.

The following is the ground on which the performance is required. In case the facsimile adopts a transmission synchronizing system, the driving energy for the resonator for transmission synchronizing in the receiving side disappears in accordance with a momentary break in the principal communication line, ending in to stop the oscillation some time after. Due to the fact an electric motor for scanning loses its function. In order to overcome such a drawback, the means illustrated in FIG. 2 is provided in the receiving side.

In accordance with an embodiment of this invention, there is provided with a means 7 for detecting the fact that a momentary break in the principal communication line ends and the line is restored. This means 7 may be the momentary break detecting and signalling means 1 shown in FIG. 1, which is provided also to functionate as above. Alternatively, another means may be provided especially to this end. There is a change-over switch 8 which acts by the output of the detecting means 7. When a momentary break occurs, a contact 8–2 becomes on automatically by the action of this change-over switch 8. The change-over switch 8 is connected with a circuit 9 including a tuning-fork or other resonator, which is driven normally by a synchronizing signal transmitted from the sending side through the principal communication line and the contact 8–1, while the output of the circuit 9 is connected with an amplifier 10 for a synchronous motor. The amplifier 10 is provided for energizing the synchronous motor which drives a scanning mechanism including the receiving cylinder. There is a phase shifter-and-amplifier 11 whereby the circuit 9 including the tuning-fork or other resonator is made to act as an oscillator during the period of a momentary break when the change-over switch 8 has acted. The synchronizing signal sent from the sending side is received by the receiving side in such a manner as shown by an arrangement 12. It is to be seen that such a signal is not received by the receiving side during the momentary break. The phase of the wave form of the oscillating circuit formed by the resonator circuit 9 and the phase shifter-and-amplifier 11 during the momentary break is monitored by a monitoring means 13. Particularly, when a momentary break has ended but the traverse scanning has not yet been resumed, the phase of the wave form of the synchronizing signal transmitted from the sending side is compared with that of the oscillating circuit formed by the circuits 9 and 11. When these phases coincide with each other, the change-over switch 8 is turned into the contact 8–1 automatically. But when the two phases do not coincide with each other, the phase of the latter is adjusted by the phase shifter-and-amplifier 11. Upon adjustment the above change-over to the contact 8–1 is effected so as to make the synchronizing signal flow. Thus it is possible that, when an occurrence of a momentary break is detected by the detecting means 7, the change-over from the transmission synchronizer to the independent synchronizer is done automatically. (4) When the momentary break ends or the principal communication line restores its normal state, the traverse scanning in the receiving side is resumed manually or, alternatively, automatically after a predetermined period from the end of the momentary break.

Figure 3:
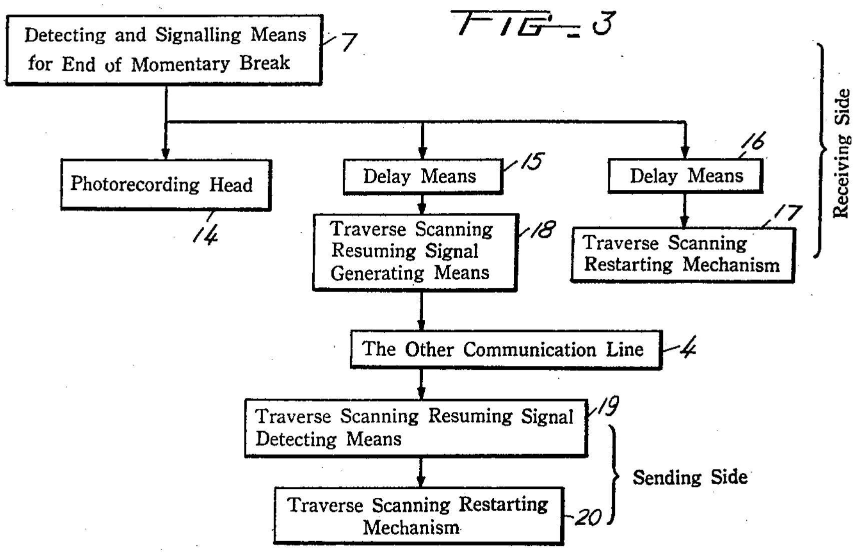
FIG. 3 is an explanatory diagram illustrating means for resuming the traverse scannings automatically at the sending side and the receiving side.
Figure 4:
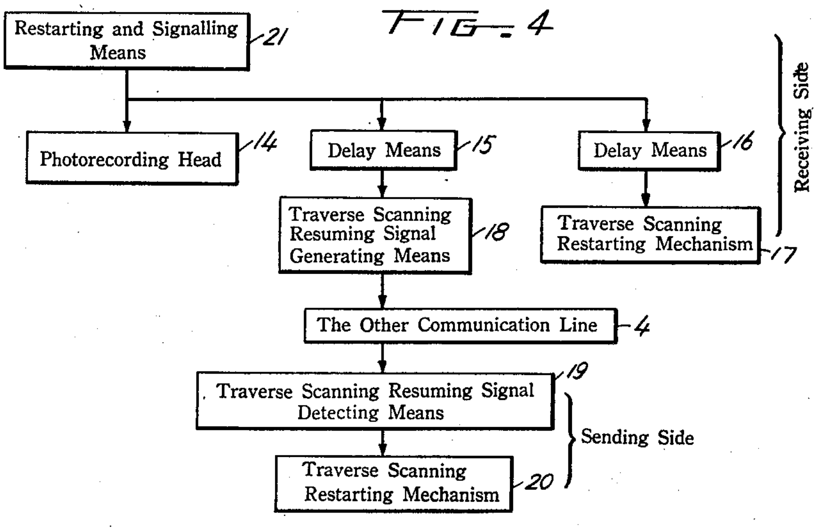
FIG. 4 is an explanatory diagram illustrating means for resuming the traverse scannings manually at the sending side and the receiving side.

The resumption of the operation of the facsimile receiver to the normal state where the photorecording and the traverse scanning actions are continued, requires an order in which the photorecording head 14 employing a glow tube modulator is resumed to the normal state at first and then the traverse scanning is resumed. The ground on which the order is necessary will be explained as follows:

In general, a position of the scanning spot around the circumference of the receiving cylinder at the instant when the traverse scanning is interrupted in accordance with a momentary break in the principal communication line differs from a position thereof at the instant when the traverse scanning is resumed after the momentary break has ended. Therefore, if the two resumptions are done at the same time, an area which is not subjected to the photorecording action would be left and extend along a length of from none to one turn of the receiving cylinder. For example, in case a newspaper is produced by means of the transmission of a full page thereof by facsimile, a black line corresponding to the area would appear on the printed newspaper ending in to degrade itself. In order to overcome the above difficulty, when a momentary break in the principal communication line is ended, it has been found that it is proper that the photorecording head 14 employing a glow tube modulator is reactuated in accordance with the arrival of the signal on which the descriptive material is transmitted from the sending side and then the traverse scanning is resumed in another manner. FIGS. 3 and 4 illustrate arrangements in these connections.

As shown in FIG. 3, there is a photorecording head 14 employing a glow tube modulator. When a monentary break in the principal communication line ends, the output appears at the detecting means 7 and controls the photorecording head 14 so as to resume the photorecording action. There are two delay means 15 and 16 for delaying the transmission of signals to resume the traverse scannings in the sending side and the receiving side, whereby the resuming instant of the traverse scanning in the receiving side is adjusted to coincide with the resuming instant of the traverse scanning in the sending side as far as possible. The resumption of the traverse scanning in the receiving side is achieved by means of a mechanism 17. The resumption of the traverse scanning in the sending side is instructed by a traverse scanning resuming signal transmitted from a traverse scanning resuming signal generating means 18 in the receiving side to the sending side. In the sending side, the traverse scanning resuming signal is received by a means 19, by an output of which a traverse scanning resuming mechanism 20 is controlled so as to resume the traverse scanning in the sending side automatically. The arrangement shown in FIG. 4 is similar to that shown in FIG. 3, but a restarting and signalling means 21 is substituted for the detecting and signalling means 7. While Fig. 3 illustrates a case where the traverse scannings are restarted automatically in the sending side and the receiving side upon detection of the end of the momentary break, FIG. 4 illustrates a case where the traverse scannings are not restarted automatically even when the end of a momentary break is detected, but are restarted manually after monitoring the difference in phase and further adjusting the same by the monitoring means 13 as shown in FIG 2

Figure 5:
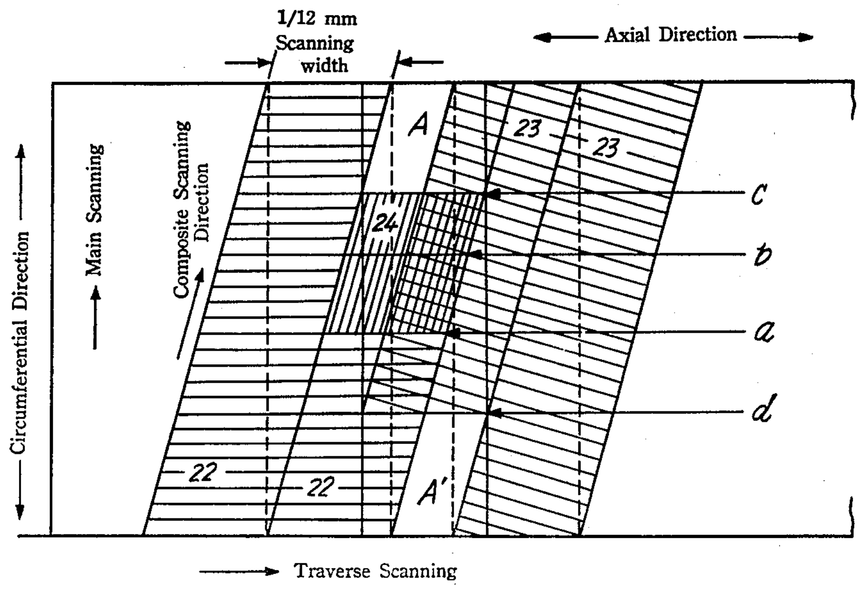
FIG. 5 is an exploded view of a negative film received by the receiving side.

FIG 5 is provided for explaining the occurrence of a blank line in a received film or a blank line in a printed newspaper as described hereinbefore. In FIG. 5, a position of the scanning spot of the photorecording head 14 at the instant when a momentary break in the principal communication line happens is represented by a character "*a*." Another position of the spot at the instant when the momentary break is detected is represented by a character "*b*." Still another position of the spot at the instant when the traverse scanning is interrupted by the action of the traverse scanning interrupting mechanism 2 is represented by a character "*c*." (After the interruption of the traverse scanning, the main scanning or the rotation of the receiving cylinder only is continued.) Further another position of the spot at the instant when the traverse scanning is restarted after the principal communication line is restored, is represented by a character "*d*." An area 22 has been recorded before the momentary break happens. Another area 23 is recorded after the restoration of the principal communication line from the momentary break and restart of the traverse scanning. Still another area 24 represents a part recorded by a picture signal corresponding to the white signal, which is generated by the action of the momentary break during the period of from the occurrence of the momentary break in the principal communication line to the interruption of the traverse scanning (where, practically speaking, no inupt signal is received by the receiving side). After the restoration of the principal communication line and before the restart of the traverse scanning, as the picture signal has been received by the receiving side, when the photorecording head 14 is resumed, the picture signal is recorded on the unexposed parts A and A′. In these processes, even if the traverse scannings in the sending side and the receiving side have been interrupted automatically, the axial position where the scanning spot is interrupted in the sending side does not completely coincide with that in the receiving side in general under the influences of the transmitting time of the traverse scanning interrupting signal sent from the receiving side to the sending side, a difference between performance times of the traverse scanning interrupting mechanisms in the sending side and the receiving side, and the like. However, in this case, the correlation of a scanning line with the adjoining one is large. That is, even if the scanning line in the sending side is different in its axial position from the scanning line in the receiving side to a certain extent, since the extent is within the range of 1/12 mm. axially, the two picture signals are almost the same with each other resulting in that there is no obstacle in view of the practice.

Similarly, it is not necessary to coincide an interrupted point and a restarted point on the cylinder for the traverse scanning in the sending side completely with those points in the receiving side. For example, if the traverse scanning in the receiving side is restarted after a half rotation of the cylinder in the sending side from the restart thereof, it becomes to contract the width of the received picture by half of the scanning width. However, since the correlation of a scanning line with an adjoining one is large and, furthermore, the scanning width has been normally so selected as to be smaller than the resolving power limit of the human eye, a contraction to such an extent as above does not almost become an objection.

While a particular embodiment of the invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of the invention.

What is claimed as new and desired to be secured by Letters Patent of the United States is:

1. In a facsimile equipment comprising a sending side, a receiving side, and two communication lines connecting the former with the latter, said sending side comprising a cylinder traversingly scanned, and said receiving side comprising a cylinder traversingly scanned and a means of exposing a spot on the second-named cylinder with a light to form a picture, a system for removing influence of a momentary break in the principal one of said two communication lines to said picture, comprising steps of detecting said momentary break automatically at said receiving side when the same occurs, interrupting the second-named traverse scanning and said exposing at said receiving side and simultaneously sending a traverse scanning interrupting signal to said sending side through the other of said two communication lines when said detection of momentary break is signalled, detecting the first-named signal at said sending side, interrupting only the first-named traverse scanning at said sending side, detecting an end of said momentary break at said receiving side, resuming said exposing at said receiving side when the third-named detection is signalled, resuming the second-named traverse scanning with delay from said resuming of said exposure and simultaneously sending a traverse scanning resuming signal to said sending side through the other of the two communication lines, detecting the last-named signal at said sending side, and resuming the first-named traverse scanning at said sending side.

2. In a facsimile equipment comprising a sending side, a receiving side, and two communication lines connecting the former to the latter, said sending side comprising a cylinder traversingly scanned, and said receiving side comprising a cylinder traversingly scanned, a means of exposing a spot on the second-named cylinder with a light to form a picture, a resonator for the transmission synchronizing, which is not adapted to be used as an independent synchronizer, and an independent synchronizing means, a system for removing influence of a momentary break in the principal one of said two communication lines to said picture, comprising steps of detecting said momentary break automatically at said receiving side when the same occurs, interrupting the second-named traverse scanning and said exposing at said receiving side and simultaneously sending a traverse scanning interrupting signal to said sending side through the other of said two communication lines when said detection of said momentary break is signalled, also simultaneously switching off from said resonator to said independent synchronizing means, detecting the first-named signal at said sending side, interrupting only the first-named traverse scanning at said sending side, detecting an end of said momentary break at said receiving side, resuming said exposing at said receiving side when the third-named detection is signalled, comparing an oscillation developed by said independent synchronizing means with a synchronizing signal transmitted from said sending side and making the former coincide with the latter, switching off back from said independent synchronizing means to said resonator, resuming the second-named traverse scanning upon said coincidence and simultaneously sending a traverse scanning resuming signal to said sending side through the other of said two communication lines, detecting the last-named signal at said sending side, and resuming the first-named traverse scanning at said sending side.

3. In a facsimile equipment comprising a sending side, a receiving side, and two communication lines connecting the former to the latter, said sending side comprising a cylinder traversingly scanned, and said receiving side comprising a cylinder traversingly scanned, a means for exposing a spot on the second-named cylinder with a light to form a picture, and a resonator for the transmission synchronizing, which is also available as an independent synchronizing means, a system for removing influence of a momentary break in the principal one of said two communication lines to said picture, comprising steps of detecting said momentary break automatically at said receiving side when the same occurs, interrupting the second-named traverse scanning and said exposing at said receiving side and simultaneously sending a traverse scanning interrupting signal to said sending side through the other of said two communication lines when said detection of momentary break is signalled, also simultaneously switching off a circuit including said resonator so as to make the same functionate as said independent synchronizing means, detecting the first-named signal at said sending side, interrupting only the first-named traverse scanning at said sending side, detecting an end of said momentary break at said receiving side, resuming said exposing at said receiving side when the third-named detection is signalled, comparing an oscillation developed by said resonator functionating as said independent synchronizing means with a synchronizing signal transmitted from said sending side and making the former coincide with the latter, switching off back said circuit to operate said resonator in accordance with said transmission synchronizing, resuming the second-named traverse scanning upon said coincidence and simultaneously sending a traverse scanning resuming signal to said sending side through the other of said two communication lines, detecting the last-named signal at said sending side, and resuming the first-named traverse scanning at said sending side.

No references cited.